A. THOMSON.

Assignor, by direct and mesne assignments, to J. B. MILLER.

MILK STRAINER.

No. 11,015. Reissued July 23, 1889.

Witnesses.

F. B. Fethuotonhaugh.

Chas. H. Riches

Inventor:

Alexander Thomson by Donald C. Ridout & Co

Attys

N. PETERS, Photo-Lithographer, Washington, D. C.

UNITED STATES PATENT OFFICE.

ALEXANDER THOMSON, OF CAINTOWN, ONTARIO, ASSIGNOR, BY DIRECT AND MESNE ASSIGNMENTS, TO JOHN BELLAMY MILLER, OF PARRY SOUND, ONTARIO, CANADA.

MILK-STRAINER.

SPECIFICATION forming part of Reissued Letters Patent No. 11,015, dated July 23, 1889.

Original No. 385,582, dated July 3, 1888. Application for reissue filed March 15, 1889. Serial No. 303,504. Patented in Canada February 13, 1888, No. 28,508.

*To all whom it may concern:*

Be it known that I, ALEXANDER THOMSON, a subject of the Queen of Great Britain, residing at Caintown, in the county of Leeds, in the Province of Ontario, Canada, have invented certain new and useful Improvements in Milk-Strainers, (for which I have received Letters Patent in Canada, No. 28,508, dated February 13, 1888;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in milk-strainers; and it consists in the special construction and combination of the parts, as will be hereinafter fully set forth, and specifically pointed out in the claims.

Figure 2:
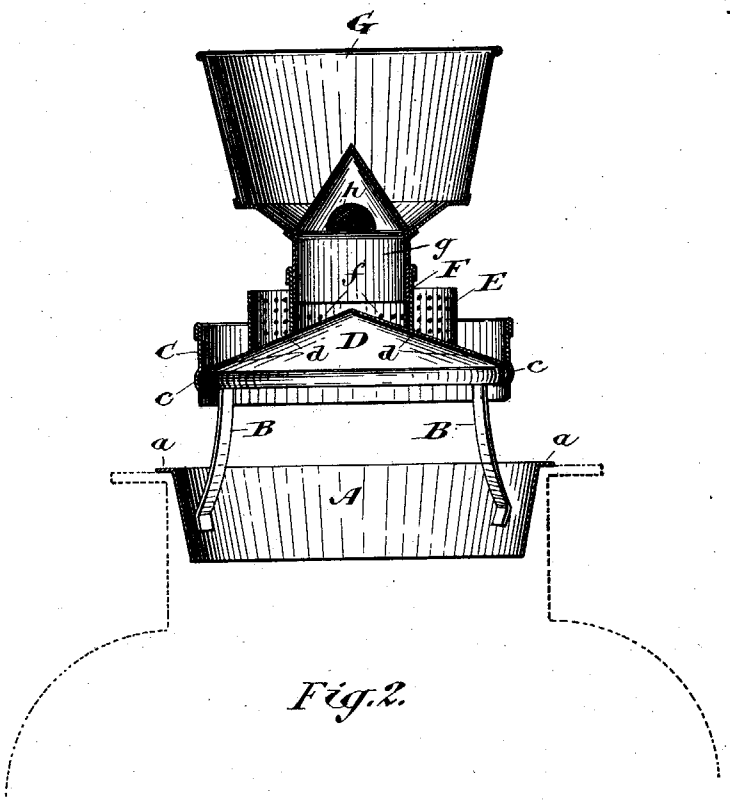
Figure 1:
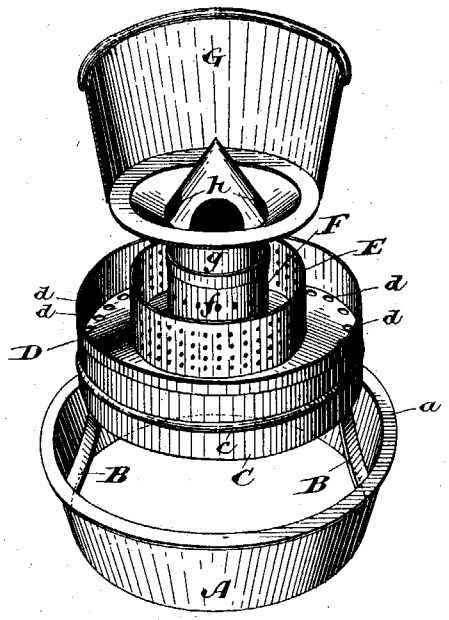

In the accompanying drawings, Figure 1 is a perspective view of my improved milk strainer and cooler and aerater, the upper portion thereof being broken away to better show the interior construction. Fig. 2 is a sectional view.

A refers to a tapered rim provided at its upper edge with an outwardly-projecting flange *a*, this rim and flange being of a size to readily fit within the neck of an ordinary milk-can, such as is used in transportation. To the interior of this rim are secured upwardly-projecting standards B B, which are bent slightly inward, the upper ends thereof being rigidly secured to a ring or band C, the upper edge of which is beaded. Near the lower edge this band C is spun to provide an outwardly-projecting bead *c*, to which is secured a conical plate D, said plate having near its edge a series of perforations *d d*.

To the conical plate D, at a slight distance above the perforations *d*, is secured a ring or band of perforated metal, which projects above the upper edge of the band C, and within the same is secured a ring or band F, of sheet metal, formed with perforations *f*. This band or ring F is adapted to support the combined funnel and strainer G, which has at its lower end a hollow socket *g*, which will fit the band F, and above this socket or tube is secured a conical cap, which is cut away at its base to provide openings covered with pieces of fine wire-gauze *h*.

This device is adapted to cool the milk by separating the same into small streams, so as to be readily affected by atmospheric influence.

When it is desired to strain and cool the milk, it is poured into the upper funnel or receptacle G, and will pass through the wire-gauze *h*, so as to retain or hold back foreign substances. The milk will then pass into the perforated sheet-metal ring F and through the openings therein in fine jets, and will then again be separated by the perforated band E, and will flow down the conical plate D, through the openings *d* therein, into the milk-can. By thus separating the milk into numerous small streams the animal heat can be removed therefrom, which is very desirable before canning milk for transportation.

This device is not only useful in abstracting the animal heat from the milk, but is also useful in the manufacture of cheese for mixing with milk such ingredients or substances as may be deemed necessary.

I claim—

1. A device for aerating and cooling liquids, consisting of a straining receiver or funnel G, and a cylinder arranged centrally under the funnel and provided with a series of small holes arranged to discharge the milk radially and outwardly in separate streams in a horizontal direction, substantially as described.

2. A device for aerating and cooling liquids, comprising a receiver or funnel G, provided with suitable strainers, a perforated cylinder below the same, and a perforated ring surrounding said cylinder, substantially as described.

3. A device for aerating and cooling liquids, comprising a receiver or funnel G, provided with suitable strainers, a perforated cylinder below the same, a perforated ring surrounding said cylinder, an imperforate ring surrounding said perforated ring, and a conical plate connecting said rings and cylinder together and having perforations near its outer edge, substantially as described.

4. In a device for aerating milk, the combination of a funnel provided with strainers *h h*, attached over openings formed in the sides of a conical portion, a band C, having a conical plate D, with perforations *d* therein, a perforated band E, and a supporting-band F, with perforations *f*, the parts being organized substantially as shown, and for the purpose set forth.

5. The combination, in a strainer and cooler for the purpose set forth, of a flanged rim A, having upwardly-projecting standards secured thereto, said standards supporting at their upper ends a band C, of less diameter than the rim A, a conical plate D, with perforations *d*, perforated bands E and F, projecting upwardly therefrom, and a funnel G, having a strainer and depending portion *g*, adapted to fit within the band, substantially as and for the purpose set forth.

Dated at Brockville, in the county of Leeds, this 23d day of January, A. D. 1888.

ALEXANDER THOMSON.

In presence of—

WALLIS DUNN,

M. M. BROWN.